United States Patent
Zohar et al.

(10) Patent No.: US 8,661,777 B2
(45) Date of Patent: Mar. 4, 2014

(54) SOLAR COMBINED CYCLE POWER SYSTEMS

(75) Inventors: Yotam Zohar, Haifa (IL); Eli Mandelberg, Tel Aviv (IL); Jacob Karni, Rehovot (IL)

(73) Assignees: Yeda Research Development Co. Ltd, Rehovot (IL); Heliofocus Ltd., Ness Ziona (IL)

( * ) Notice: Subject to any disclaimer, the term of this patent is extended or adjusted under 35 U.S.C. 154(b) by 0 days.

(21) Appl. No.: 13/145,188

(22) PCT Filed: Jan. 19, 2010

(86) PCT No.: PCT/IL2010/000048
§ 371 (c)(1),
(2), (4) Date: Jul. 19, 2011

(87) PCT Pub. No.: WO2010/082206
PCT Pub. Date: Jul. 22, 2010

(65) Prior Publication Data
US 2011/0283700 A1      Nov. 24, 2011

Related U.S. Application Data

(60) Provisional application No. 61/145,583, filed on Jan. 19, 2009.

(51) Int. Cl.
*F02C 6/00* (2006.01)
*F01K 23/04* (2006.01)

(52) U.S. Cl.
USPC .............. 60/39.182; 60/641.8; 60/641.15; 60/655

(58) Field of Classification Search
USPC ............... 60/39.182, 783, 784, 801, 60/641.8–641.15, 655, 654, 677–680
See application file for complete search history.

(56) References Cited

U.S. PATENT DOCUMENTS 4,942,736 A * 7/1990 Bronicki .............. 60/641.12
5,417,052 A * 5/1995 Bharathan et al. ........... 60/783

(Continued)

FOREIGN PATENT DOCUMENTS

CN       101055121 B    10/2007
DE         4400003 A1    7/1995

(Continued)

OTHER PUBLICATIONS

International Search Report and Written Opinion of The International Searching Authority for International Application No. PCT/IL10/00048, 8 pages, mailed Jun. 1, 2010.

(Continued)

*Primary Examiner* — Hoang Nguyen
(74) *Attorney, Agent, or Firm* — Vorys, Sater, Seymour and Pease LLP; Susanne M. Hopkins; William L. Klima

(57) ABSTRACT

A combined cycle power system is provided including at least one solar power plant including a concentrating dish configured to concentrate solar radiation; a solar receiver disposed and configured to utilize concentrated solar radiation for heating a first working fluid, and a first turbine configured for generating electricity by expansion therein of the heated first working fluid, and at least one recovery power plant including a heat recovery unit configured for utilizing exhaust heat of the first turbine to heat a second working fluid, and a second turbine configured for generating electricity by expansion therein of the heated second working fluid.

23 Claims, 14 Drawing Sheets

(56) References Cited

U.S. PATENT DOCUMENTS

| | | | |
|---|---|---|---|
| 5,444,972 | A | 8/1995 | Moore |
| 5,704,209 | A | 1/1998 | Bronicki et al. |
| 5,799,490 | A * | 9/1998 | Bronicki et al. ............... 60/655 |
| 6,230,480 | B1 | 5/2001 | Rollins, III |
| 6,832,485 | B2 | 12/2004 | Sugarmen et al. |
| 7,051,529 | B2 | 5/2006 | Murphy et al. |
| 7,607,299 | B2 | 10/2009 | Carroll |
| 7,612,285 | B2 | 11/2009 | Horne et al. |
| 7,845,172 | B2 * | 12/2010 | Goldman ..................... 60/641.8 |
| 8,312,703 | B2 * | 11/2012 | Aoyama et al. ............ 60/39.182 |
| 2006/0260314 | A1 | 11/2006 | Kincaid et al. |
| 2008/0121755 | A1 | 5/2008 | Bennett |

FOREIGN PATENT DOCUMENTS

| | | |
|---|---|---|
| GB | 2341855 A | 3/2000 |
| JP | 2001193419 A | 7/2001 |
| RU | 2184322 C2 | 6/2002 |

OTHER PUBLICATIONS

McDonald, "A Hybrid Solar closed-Cycle Gas Turbine combined Heat and Power Plant Concept to Meet the Continuous Total Energy Needs of a Small Community", Heat Recovery Systems, vol. 6, No. 5, pp. 399-419, (1986).

* cited by examiner

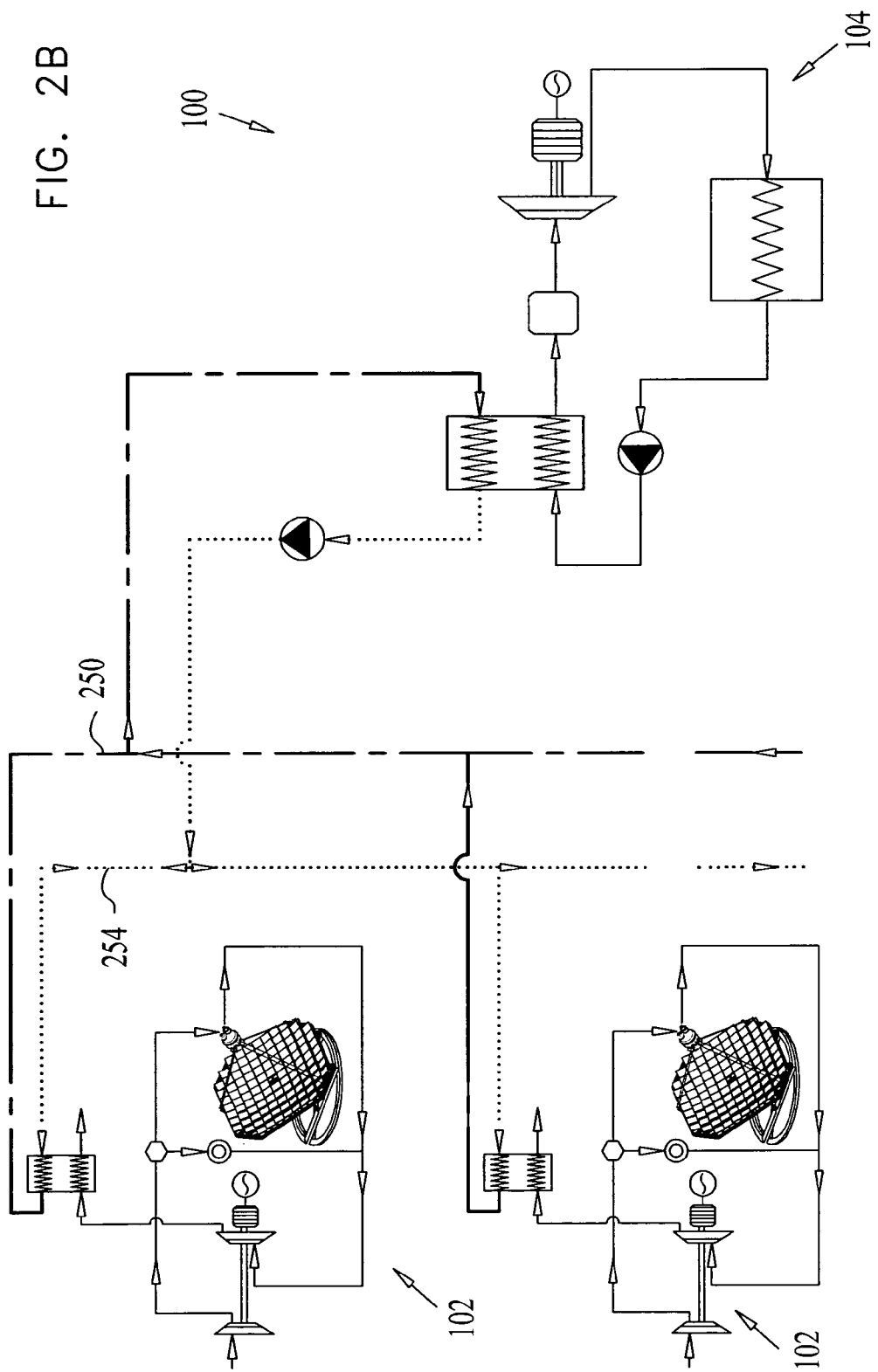

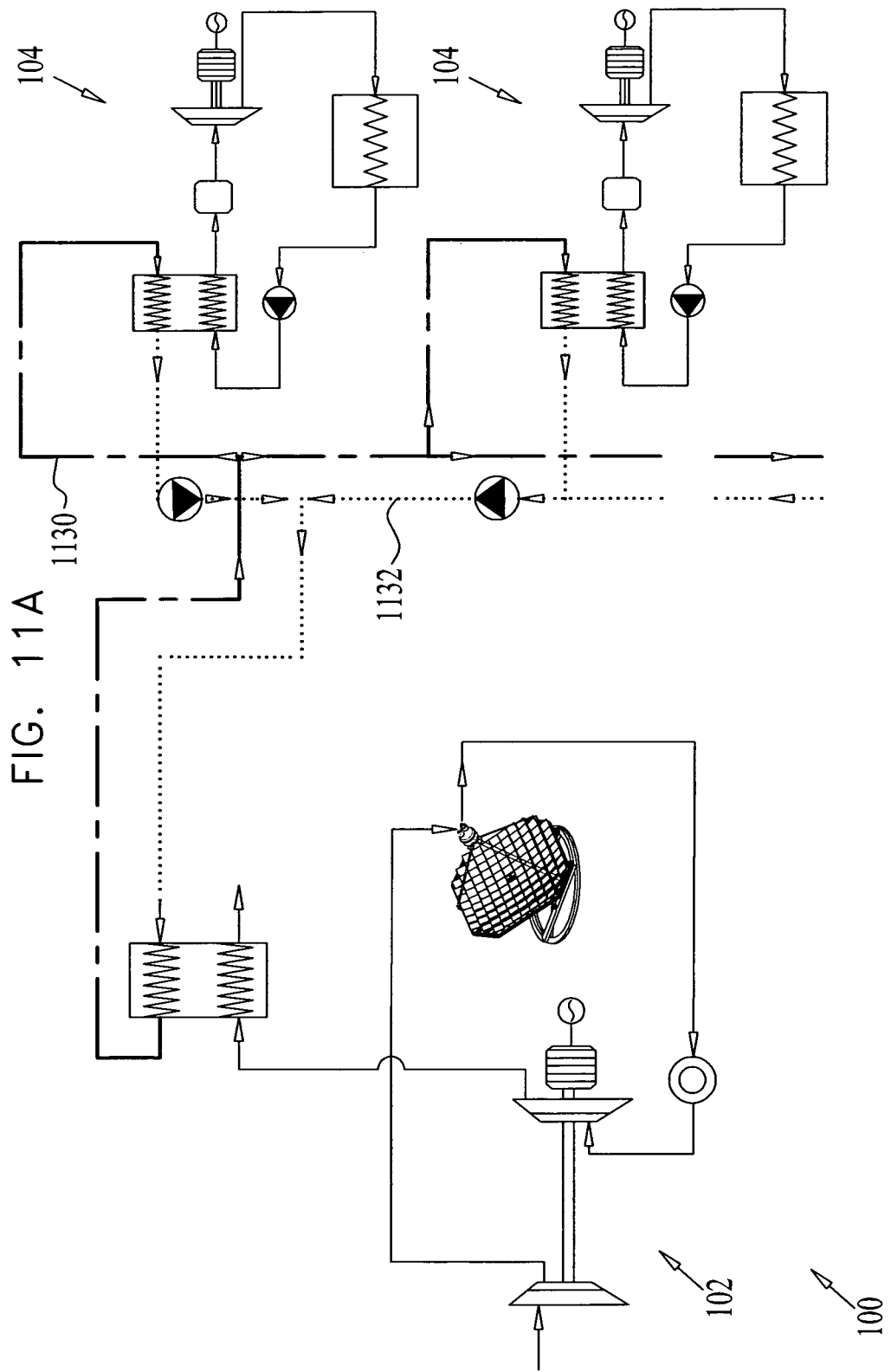

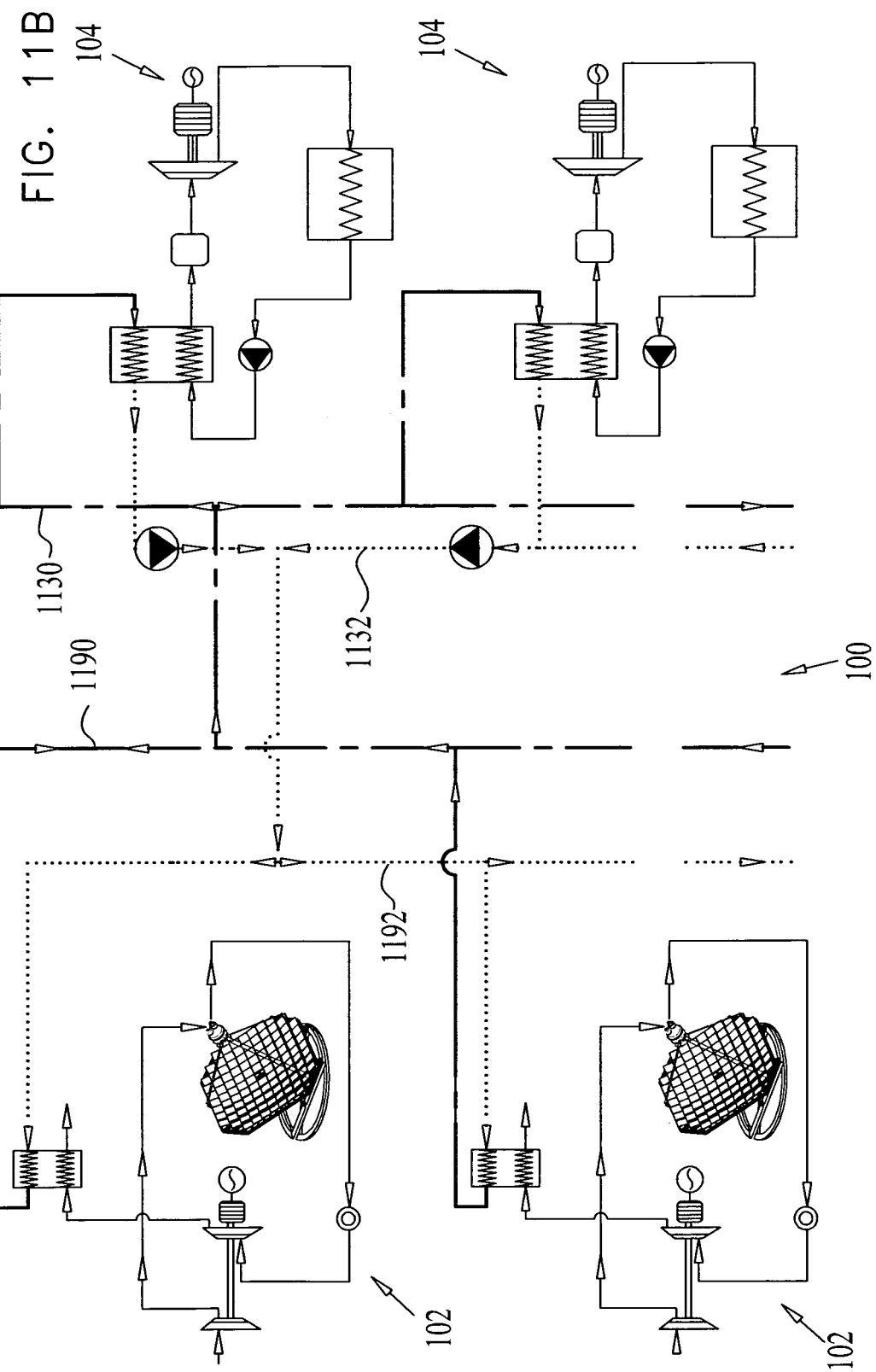

SOLAR COMBINED CYCLE POWER SYSTEMS

This is a National Phase Application filed under 35 U.S.C. §371 as a national stage of PCT/IL2010/000048, filed on Jan. 19, 2010, an application claiming the benefit under 35 U.S.C. §119(e) of U.S. Provisional Application No. 61/145,583, filed on Jan. 19, 2009, the content of each of which is hereby incorporated by reference in its entirety.

FIELD OF THE INVENTION

The present invention relates generally to solar combined cycle power systems.

BACKGROUND OF THE INVENTION

Combined cycle power systems that include a first turbine and a second turbine designated to utilize waste heat from the first turbine, are well known. Generally, the combined cycle power system comprises a topping cycle including the first turbine and the second turbine may be included in a bottoming cycle. For example, the topping cycle may be an open loop Brayton cycle or a closed loop Brayton cycle and the bottoming cycle may be an open loop Rankine cycle or a closed loop Rankine cycle.

SUMMARY OF THE INVENTION

According to one aspect of the present invention, there is provided a combined cycle power system comprising:
  at least one solar power plant comprising:
    a concentrating dish configured to concentrate solar radiation,
    a solar receiver disposed and configured to utilize concentrated solar radiation for heating a first working fluid, and
    a first turbine configured for generating electricity by expansion therein of the heated first working fluid, and
  at least one recovery power plant including
    a heat recovery unit configured for utilizing exhaust heat of the first turbine to heat a second working fluid, and
    a second turbine configured for generating electricity by expansion therein of the heated second working fluid.

The heat recovery unit may further include a heat transfer fluid configured to transfer the exhaust heat from the solar power plant to the recovery power plant. The solar power plant may be a Brayton-cycle plant and the recovery power plant may be a Rankine-cycle plant. The first working fluid and second working fluid may each be selected from the group consisting of air, water, helium, molten salt, an organic fluid, and carbon dioxide. The system may be configured to introduce the exhaust heat into at least one heat exchanger. Additionally, the system may be further configured to utilize residual heat exiting at least one heat exchanger for providing thermal energy to a thermal system. Furthermore, the system may further include a thermal storage assembly configured to selectively store at least some of the exhaust heat.

The system may further include a compressor configured to compress the first working fluid prior to entering the solar receiver. The system may include a multi-stage compressor including at least first and second compressors and an intercooling device configured for cooling the first working fluid following compression within the first compressor and prior to compression within the second compressor. The second turbine may include a multi-stage turbine. The system may include a plurality of the solar power plants.

According to another aspect of the present invention, there is provided a combined cycle power system comprising:
  at least one solar power plant including:
    a solar collection system configured to utilize impinging solar radiation for heating a first working fluid, and
    a first turbine configured for generating electricity by expansion therein of the heated first working fluid, and
  at least one recovery power plant including:
    a heat recovery unit configured for utilizing exhaust heat of the first turbine to heat a second working fluid, and
    a second turbine configured for generating electricity by expansion therein of the heated second working fluid.

BRIEF DESCRIPTION OF THE DRAWING

The present subject matter will be understood and appreciated more fully from the following detailed description, taken in conjunction with the drawings in which:

FIGS. 2A and 2B are each a simplified schematic illustration of another example of a solar combined cycle power system;

FIGS. 11A and 11B are each a simplified schematic illustration of alternative layouts of the solar combined cycle power system illustrated in FIGS. 1A through 10.

DETAILED DESCRIPTION

Figure 1A:
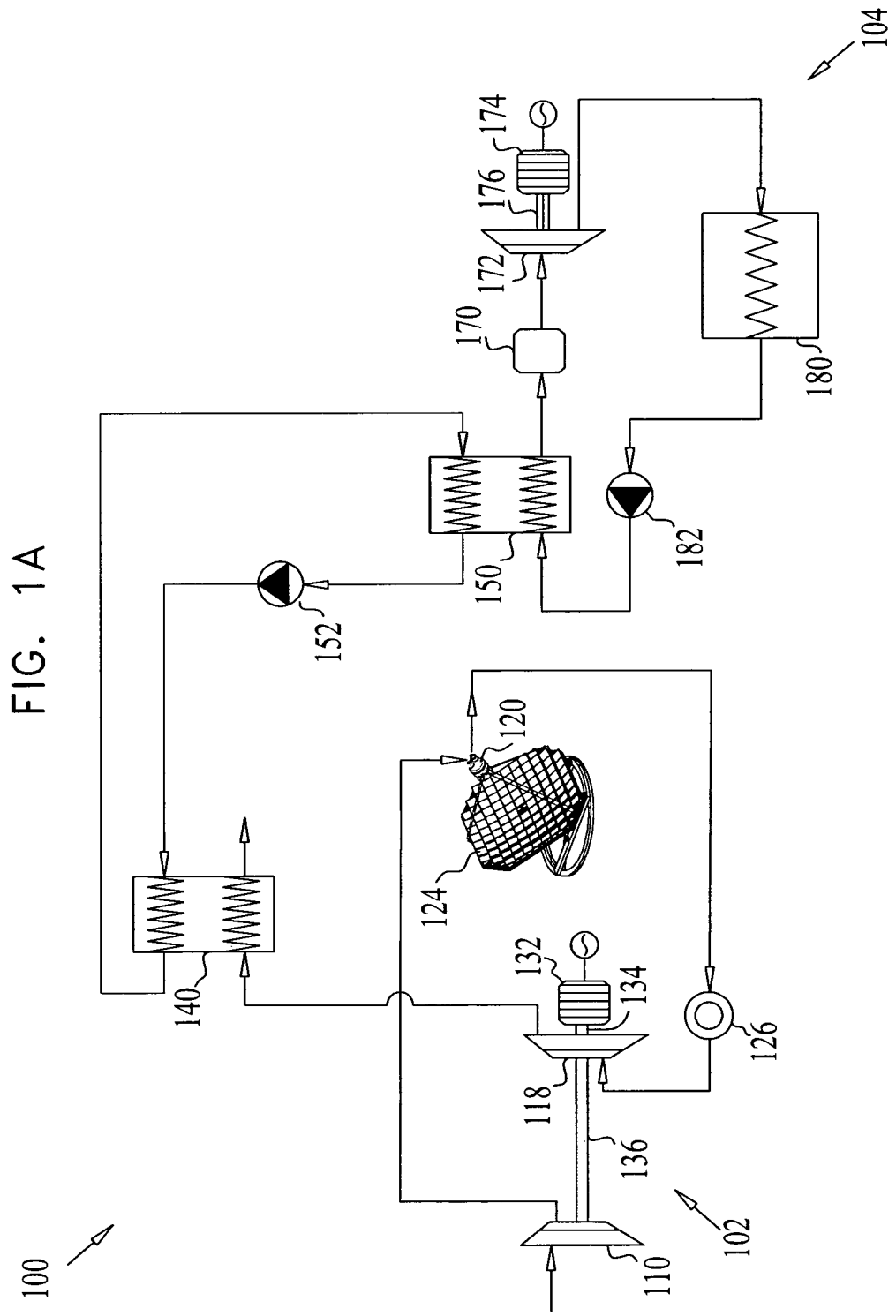
FIGS. 1A and 1B are each a simplified schematic illustration of an example of a solar combined cycle power system.

In the following description, various aspects of the present subject matter will be described. For purposes of explanation, specific configurations and details are set forth in order to provide a thorough understanding of the present subject matter. However, it will also be apparent to one skilled in the art that the present subject matter may be practiced without specific details presented herein without departing from the scope of the present invention. Furthermore, the description omits and/or simplifies some well known features in order not to obscure the description of the subject matter.

As seen in FIGS. 1A-2B, a solar combined cycle power system 100 is provided, comprising a solar power plant 102, constituting a topping cycle system, and a recovery power plant 104, constituting a bottoming cycle system. The solar power plant 102 may be driven by solar energy, or a combination of solar energy and fuel. Solar power plant 102 may comprise a first turbine 118, configured to operate in an open-loop or closed-loop Brayton cycle. Alternatively, the solar power plant 102 may be configured to operate according to any suitable thermodynamic cycle. A suitable working fluid, such as air, water, helium, molten salt, any organic fluid, or carbon dioxide, may flow within the solar power plant 102 and/or the recovery power plant 104, for driving its operation.

The solar power plant 102 communicates with recovery power plant 104. The recovery power plant 104 may be configured to operate according to a steam open- or closed-loop Rankine cycle, or an organic open- or closed-loop Rankine cycle, for example. Alternatively, the recovery power plant 104 may be configured to operate according to any suitable thermodynamic cycle. The recovery power plant 104 may receive heat from any number of solar power plants 102. For example, ten to several hundred solar power plants 102 may supply heat to a single recovery power plant 104, as seen in FIGS. 1B and 2B, or to a plurality of recovery power plants 104, as seen in FIG. 11B.

In the examples shown in FIGS. 1A-2B, the solar power plant 102 operates according to an open loop Brayton cycle, and thus includes a compressor 110 for allowing incoming working fluid, such as air, to flow therein.

In a non-limiting example, incoming air is generally ambient air (approximately 20° C.) at atmospheric pressure (approximately 1 bar).

Compressed working fluid flows out of compressor 110 at an elevated pressure to a solar receiver 120 for heating therein. It subsequently flows into first turbine 118, which may be a gas turbine, driving its operation to produce electrical energy.

In a non-limiting example, the air flows out of compressor 110 at a temperature of approximately 250° C. and at a pressure of approximately 4 bar.

Solar receiver 120 may be any suitable solar receiver designated to heat the working fluid by concentrated solar radiation. The solar radiation may be concentrated by any suitable solar collection system. The solar collection system may comprise any suitable means for concentrating solar radiation, for example using a sun-tracking concentrator, such as a dish, a trough, a Fresnel reflector, or a heliostat. In the examples shown in FIGS. 1A-2B the sun-tracking concentrator is a dish 124.

The compressed working fluid exiting the solar receiver 120 may be further heated by a combustor 126 prior to entering the turbine 118. Combustor 126 is provided so as to ensure that the working fluid reaches the turbine 118 at a desired temperature, in a non-limiting example, in the range of approximately 800° C.-1100° C. It may be active at periods of time wherein incoming solar radiation is insufficient to raise the working fluid to a desired temperature, for example during early morning, evening, and night time.

Figure 1B:
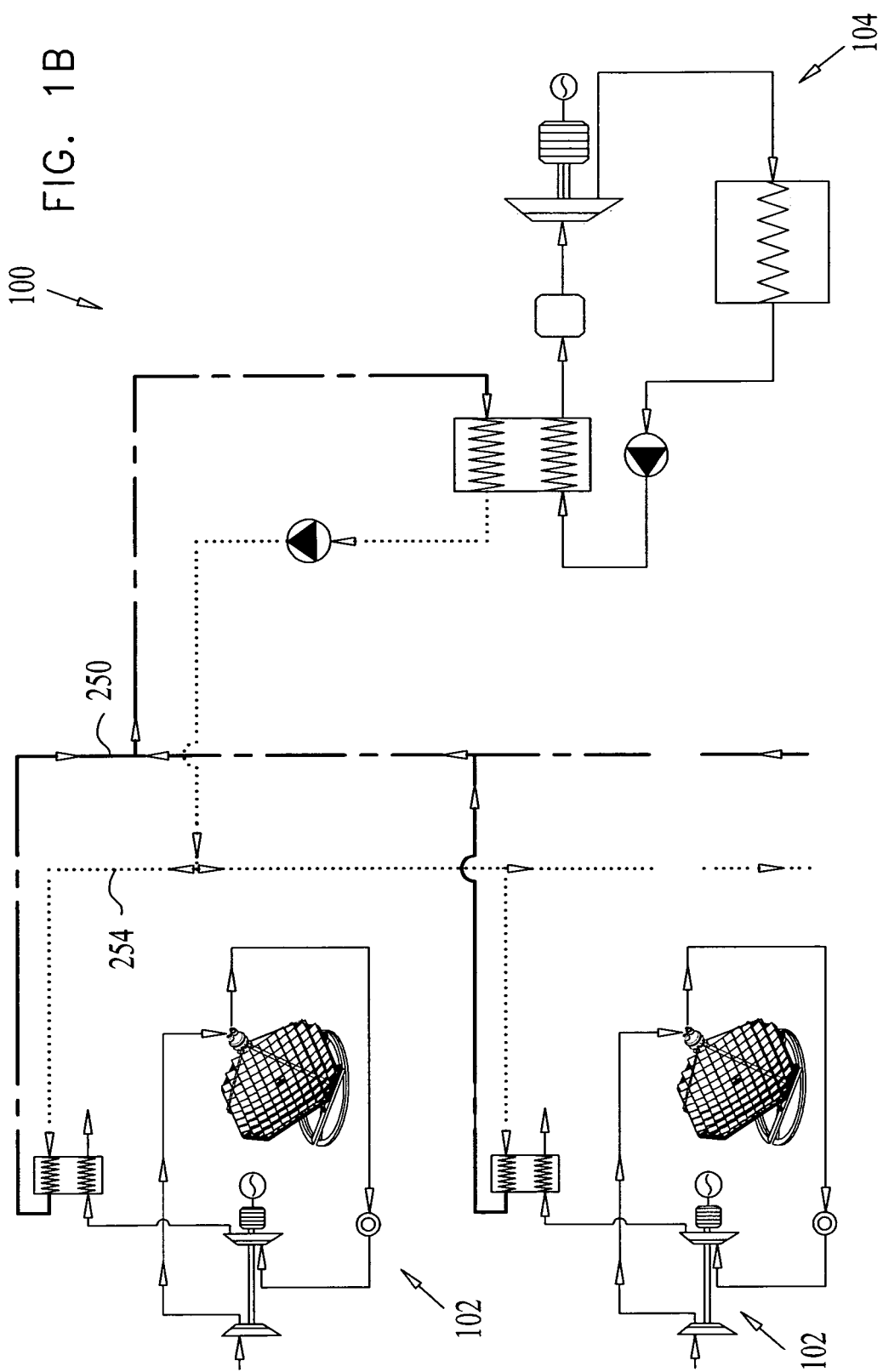
Figure 2A:
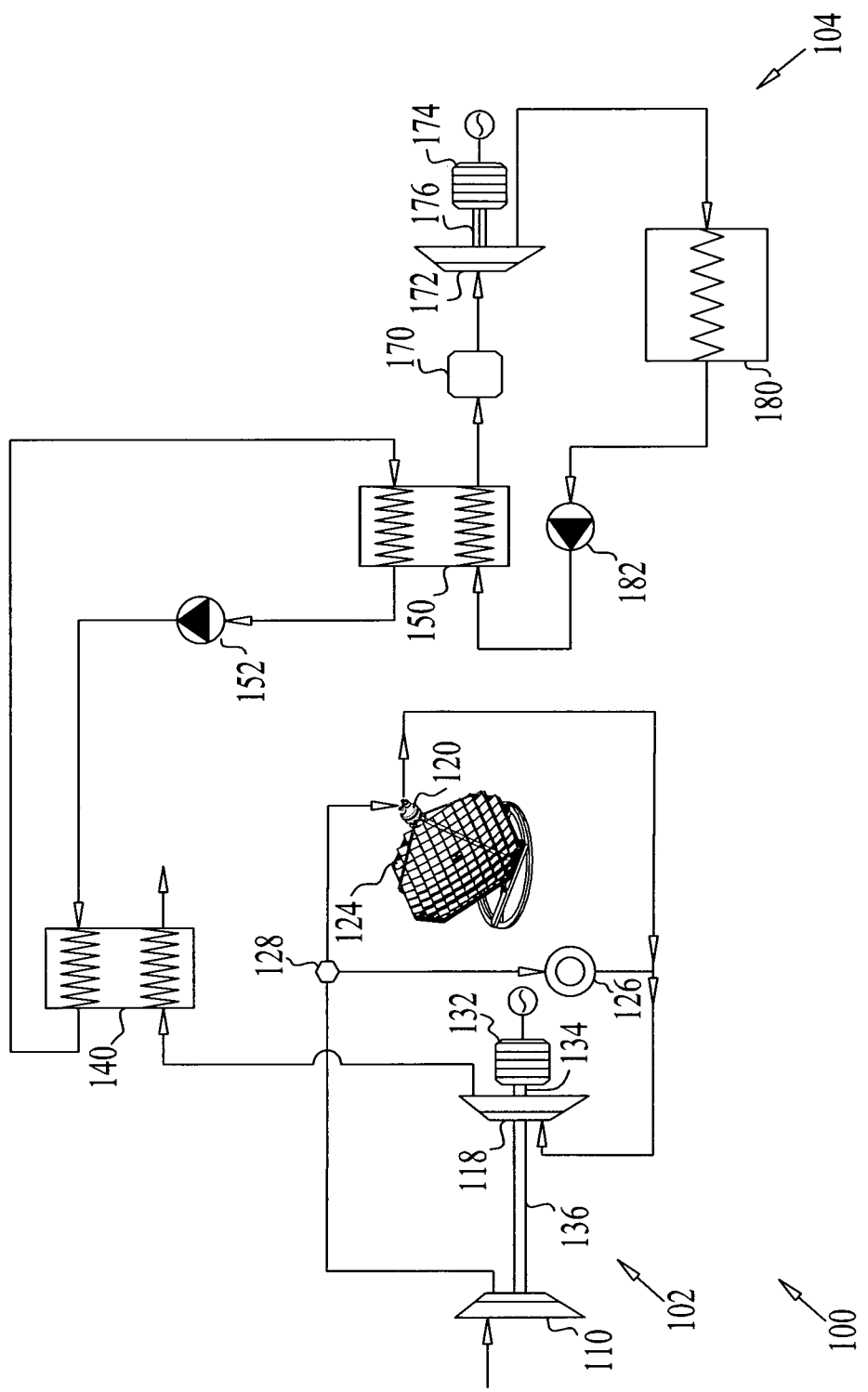

The combustor 126 may be installed in series between the solar receiver 120 and turbine 118, as shown in FIGS. 1A and 1B, or may be parallelly installed between the solar receiver 120 and turbine 118, as shown in FIGS. 2A and 2B.

A control valve 128 (FIG. 2A) may be provided to allow the working fluid to enter combustor 126 and bypass the solar receiver 120 or alternatively to direct the working fluid to flow into the solar receiver 120 and bypass combustor 126. Additionally, the control valve 128 may direct the working fluid to partially flow into the solar receiver 120 and partially flow into combustor 126.

Hot working fluid from the solar receiver 120 flows into turbine 118, which expands the working fluid and drives a generator 132 via a shaft 134 for producing electrical energy therefrom.

In a non-limiting example, the temperature of the air exiting the solar receiver 120 is approximately 1000° C. and the pressure is approximately 4 bar.

It is appreciated that while in the examples shown in FIGS. 1A-2B the compressor 110 is coupled to turbine 118 via a coupling shaft 136, according to alternative examples the coupling shaft 136 may be omitted.

The expanded working fluid exits the turbine 118 at a lowered temperature and pressure. In a non-limiting example, the temperature of the air exiting turbine 118 is approximately 650° C. and the pressure is approximately 1 bar.

The solar power plant 102 further comprises a heat exchanger 140, which may be any suitable heat-exchanging device. The expanded working fluid enters the heat exchanger 140 and heats therein a heat transfer fluid flowing between it and a heat exchanger 150 of the recovery power plant 104, as will be further described hereinbelow. The expanded working fluid exits heat exchanger 140 and flows into the atmosphere. In a non-limiting example, the temperature of the air exiting heat exchanger 140 is approximately 150° C. and the pressure is approximately 1 bar and the temperature of the heat transfer fluid exiting heat exchanger 140 is approximately 600° C. and the pressure is approximately 10 bar.

It is noted that heat exchanger 150 illustrated in FIGS. 1A-5 and 7-11B may constitute a portion of a heat recovery unit provided for utilizing exhaust heat of first turbine 118 to heat the working fluid of recovery power plant 104. Additionally or alternatively, heat exchanger 140 illustrated in FIG. 6 may constitute a portion of such a heat recovery unit. It is appreciated that the heat recovery unit may comprise additional heat exchangers and/or recuperators.

The heat transfer fluid flows into the heat exchanger 150 of the recovery power plant 104. Heat exchanger 150 is designed to transfer thermal energy from the heat transfer fluid to a working fluid of the recovery power plant 104. Heat exchanger 150 may be any suitable heat-exchanging device. For example, it may include a steam generator and a superheater configured so as to extract thermal energy from the heat transfer fluid. The heat transfer fluid exits heat exchanger 150 at a temperature lower than its entrance temperature. In a non-limiting example, the temperature of the heat transfer fluid exiting heat exchanger 150 is approximately 100° C. and the pressure is approximately 10 bar. The heat transfer fluid is thereafter reintroduced into heat exchanger 140 associated with the solar power plant 102 so as to be reheated thereby and to further provide thermal energy to the working fluid of the recovery power plant 104. A pump 152 may be provided to ensure the heat transfer fluid continues to flow between heat exchanger 150 and heat exchanger 140.

The heat transfer fluid may be any suitable fluid, such as air, water, molten salt, or an organic fluid, such as a carbon dioxide-containing fluid or synthetic organic heat transfer fluid such as that sold by the Dow Chemical Company under the trade name DOWTHERM A.

It is noted that wherein the heat transfer fluid is a gas, such as air, a blower may be provided, and wherein the heat transfer fluid is a liquid, such as water, a pump may be provided to ensure continuous flow of the heat transfer fluid. It is further noted that additional blowers and/or pumps may be added to the solar power plant 102 and/or the recovery power plant 104 to ensure that the working fluids or the heat transfer fluid flow continuously.

The working fluid of the recovery power plant 104 enters heat exchanger 150 and is heated therein. Generally, the working fluid may be heated, boiled and possibly superheated in heat exchanger 150. Vapor exits the heat exchanger 150 at an elevated temperature.

In a non-limiting example, the working fluid of the recovery power plant 104 is water. The temperature of the water entering heat exchanger 150 is approximately 80° C. and the pressure is approximately 60 bar. The temperature of the steam exiting heat exchanger 150 is approximately 370° C. and the pressure is approximately 60 bar.

The heated vapor exits the heat exchanger 150 and enters a combustor 170 and flows to a second turbine 172, typically a vapor turbine, which in turn drives a generator 174 via a shaft 176 for producing electrical energy therefrom. It is noted that combustor 170 may be omitted, and the heated vapor from heat exchanger 150 may directly enter turbine 172.

The vapor, generally at or near its saturation point, exits the turbine 172 and enters a condenser 180 wherein the vapor undergoes condensation to liquid. The liquid exits the condenser 180 substantiality at the temperature and pressure of the vapor entering the condenser 180.

In a non-limiting example, the turbine 172 is a steam turbine and the temperature of the steam exiting the steam turbine is approximately 50° C. and the pressure is approximately 0.1 bar.

The liquid exiting the condenser 180 is introduced into heat exchanger 150 via a pump 182, thereby allowing the working fluid of the recovery power plant 104 to flow continuously.

In a non-limiting example, the temperature of the water exiting pump 182 is approximately 80° C. and the pressure is approximately 60 bar.

As seen in FIGS. 1B and 2B, a solar combined cycle power system 100 may comprise a plurality of solar power plants 102 (although only two solar power plants are illustrated, it will be appreciated that any number of such plants may be provided, typically from ten to several hundred), each as described with reference to, respectively, FIGS. 1A and 1B. Each of the plurality of solar power plants 102 is in thermal communication with the recovery power plant 104 via a first main duct 250, provided to transfer the heat transfer fluid from each of the plurality of solar power plants 102 to recovery power plant 104. A second main duct 254 is provided to transfer the heat transfer fluid from recovery power plant 104 to each of the plurality of solar power plants 102.

Components of the solar combined cycle power system 100, such as the solar receiver 120 and turbine 118, may be connected therebetween by a plurality of any suitable conduits.

Main ducts 250, 254, which connect between the heat exchangers 140, 150, and/or the conduits may be formed at least partially of pipes designed to transfer the heat transfer fluid and the working fluids. Such pipes are generally formed with thermal insulation so as to prevent heat losses of the heat transfer fluid and the working fluids as the heat transfer fluid and the working fluids flow along main duct 250, 254 and/or the conduits. Such a pipe may be a pipe-in-pipe pipeline commercially available by ITP InTerPipe, Inc. of 16360 Park Ten Place, Suite 327 Houston, Tex., USA, for example.

Figure 3:
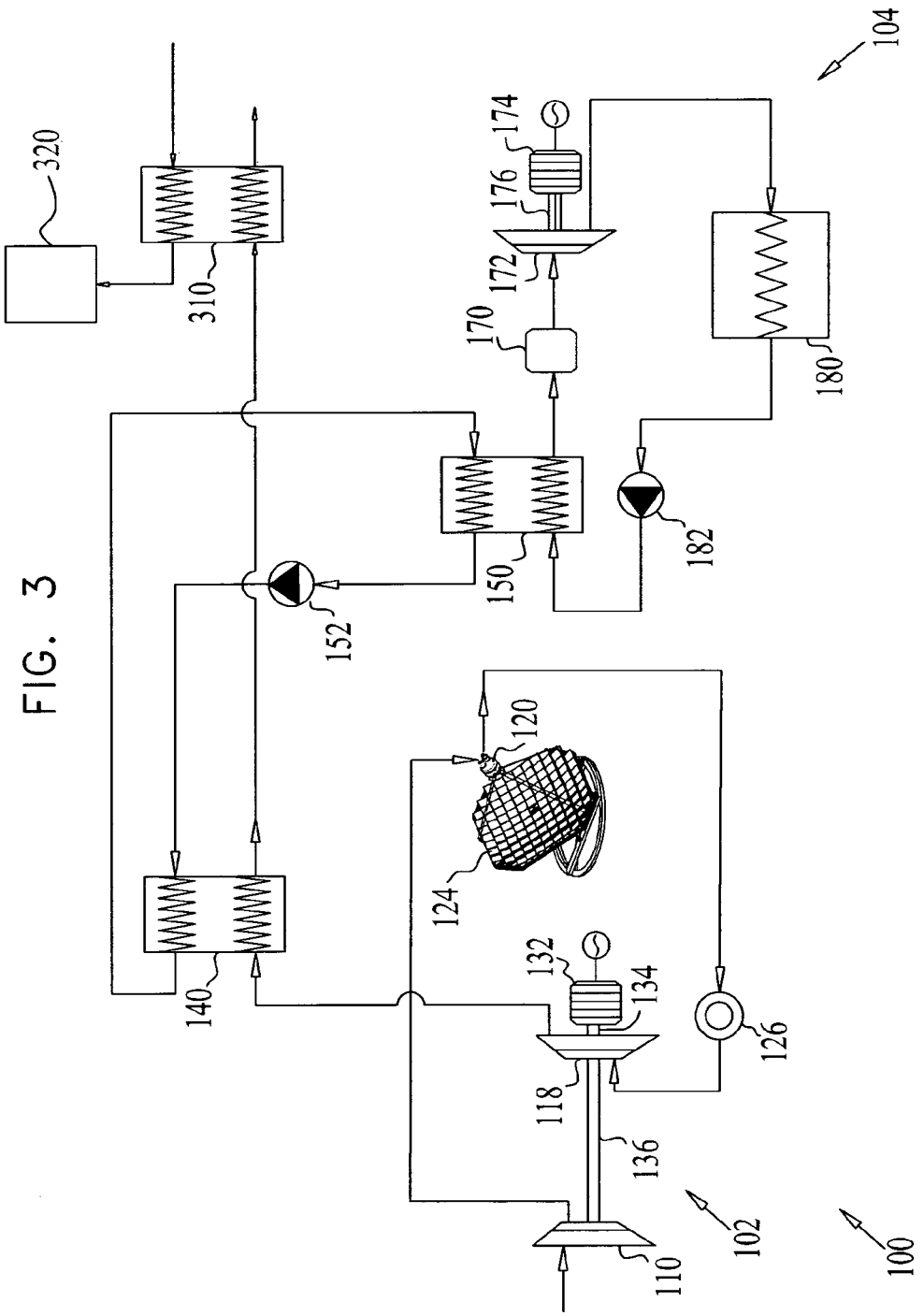
FIGS. 3 through 10 are each a simplified schematic illustration of a solar combined cycle power system, constructed and operative in accordance with modifications to the examples illustrated in FIGS. 1A-2B.

According to a modification illustrated in FIG. 3, the solar combined cycle power system 100 may comprise, in addition to the elements described in connection with FIG. 1A, an additional heat exchanger 310, configured to utilize the residual thermal energy of the working fluid exhausted from heat exchanger 140 for providing heat to one or more other thermal systems (indicated schematically at 320). For example, the working fluid of the solar plant 102 exiting the heat exchanger 140 may enter the heat exchanger 310, thereby heating an incoming heat transfer fluid, such as water. The heated water exiting the heat exchanger 310 is then utilized for providing thermal energy to the thermal system 320.

In a non limiting example, the working fluid of the solar power plant 102 is air. The air exits heat exchanger 140 at a temperature of approximately 150° C. and the pressure is approximately 1 bar and enters heat exchanger 310 so as to heat incoming water. The water enters heat exchanger 310 at a temperature of approximately 20° C. and a pressure of approximately 5 bar and is heated therein to a temperature of approximately 130° C. and a pressure of approximately 5 bar. The heated water is introduced into thermal system 320 which utilizes the heated water for any suitable heat consuming application. The air exits heat exchanger 310 at a temperature of approximately 70° C. and a pressure of approximately 1 bar.

It will be appreciated that while the modification illustrated in FIG. 3 includes a solar power plant 102 as described with reference to FIG. 1A, a solar power plant according to FIG. 2A may be provided. It will be further appreciated that the modification described with reference to FIG. 3 may be applied to a solar combined power system comprising a plurality of solar power plants 102 in thermal communication with a single recovery power plant 104, such as described with reference to FIGS. 1B and 2B, mutatis mutandis.

Figure 4:
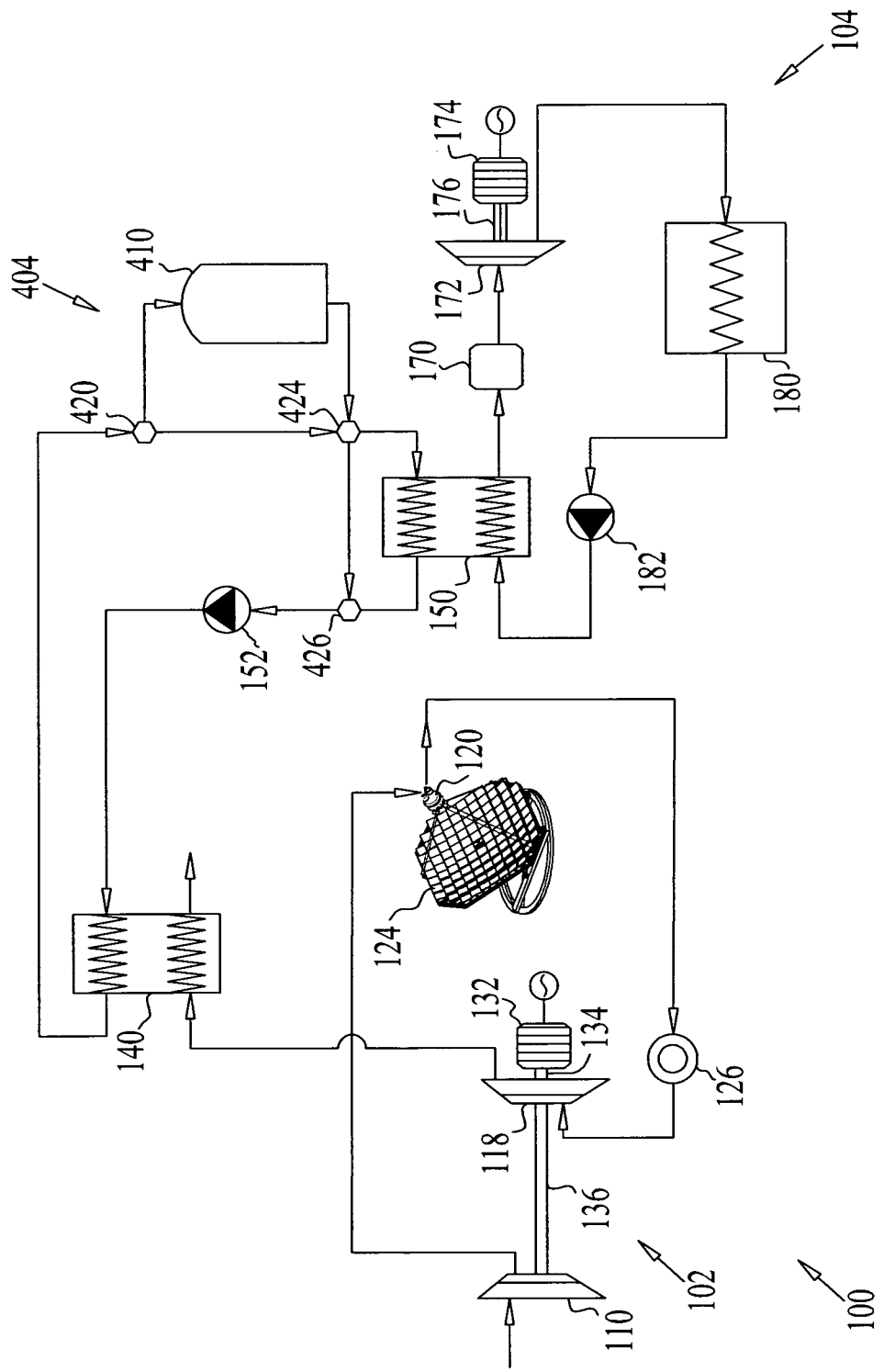

According to a modification illustrated in FIG. 4, a thermal storage system 404 may be provided between heat exchangers 140 and 150, or at any suitable location within solar combined cycle power system 100, configured to store heat from solar thermal plant 102.

The thermal storage system 404 comprises a thermal storage assembly 410 carrying a sensible heat storage material such as molten salt, organic heat transfer fluid, steam or carbon dioxide. The thermal storage assembly 410 may additionally comprise solid high heat capacity materials, or phase change materials. A single storage assembly may have a combination of these materials. For example, solid high heat capacity materials together with sensible heat materials or phase change materials together with sensible heat materials. Some storage assemblies may include a hot tank and a cold tank (not shown), used, for example, to maintain a constant temperature in the hot tank. It is noted that thermal storage assembly 410 may comprise any suitable means for providing thermal storage.

A plurality of control valve assemblies 420, 424 and 426 may be provided so as to allow various flow path configurations of the heat transfer fluid. An example of various flow path configurations via control valve assemblies 420, 424 and 426 is as follows: all the heat transfer fluid from heat exchanger 140 is directed by control valve assembly 420 to flow directly to thermal storage assembly 410 so as to be stored therein and thereafter be introduced into the recovery power plant 104 via control valve assembly 424; all the heat transfer fluid from heat exchanger 140 is directed by control valve assemblies 420 and 424 to bypass the thermal storage assembly 410 and flow directly to the recovery power plant 104; a portion of the heat transfer fluid exiting heat exchanger 140 is directed by the control valve assemblies 420 and 424 to flow directly to the recovery power plant 104, and a portion is directed by the control valve assembly 420 to flow to storage assembly 410; and all the heat transfer fluid exiting heat exchanger 140 is directed by the control valve assembly 420 to flow to storage assembly 410 so as to be stored therein and to be reintroduced thereafter into heat exchanger 140 via control valve assemblies 424 and 426.

It is noted that any one of control valve assemblies 420, 424 and 426 may be omitted. Furthermore, additional control valve assemblies may be introduced within the thermal storage system 404.

It will be appreciated that while the modification illustrated in FIG. 4 includes a solar power plant 102 as described with reference to FIG. 1A, a solar power plant according to FIG. 2A may be provided. It will be further appreciated that the modification described with reference to FIG. 4 may be applied to a solar combined power system comprising a plurality of solar power plants 102 in thermal communication with a single recovery power plant 104 and associated thermal storage assembly 410, such as described with reference to FIGS. 1B and 2B, mutatis mutandis. In addition, the modification described with reference to FIG. 3 may be combined with the modification described with reference to FIG. 4, mutatis mutandis.

Figure 5:
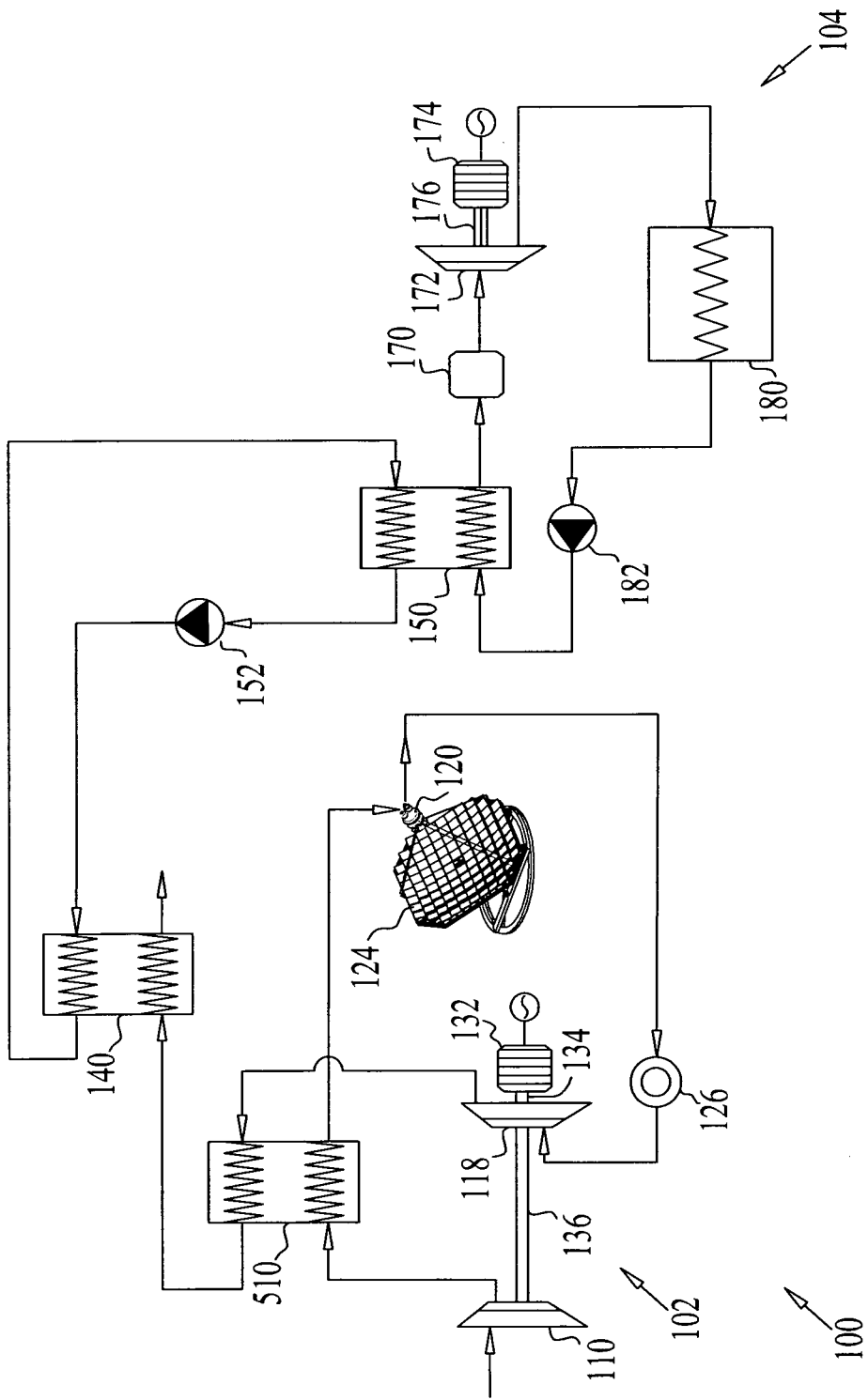

According to a modification illustrated in FIG. 5, a recuperator 510 may be provided for heating compressed working fluid flowing out of compressor 110 prior to entering the solar receiver 120. The recuperator 510 utilizes heat of the exhausted expanded working fluid flowing out of the turbine 118, before entering the heat exchanger 140, to heat working fluid exiting the compressor 110 before entering the solar receiver 120. Recuperator 510 may be any suitable device, such as a heat exchanger.

In a non-limiting example, the working fluid is air and enters the recuperator 510 from the compressor 110 at a temperature of 250° C. and a pressure of approximately 4 bar. Air enters the recuperator 510 from the turbine 118 at a temperature of approximately 650° C. and a pressure of approximately 1 bar. The air from the compressor 110 exits the recuperator 510 towards the solar receiver 120 at a temperature of approximately 400° C. with no substantial change in pressure. Air from the turbine 118 exits the recuperator 510 toward the heat exchanger 140 at a temperature of approximately 450° C. with no substantial change in pressure. The air may then exit the heat exchanger 140 into the atmosphere at a lowered temperature of approximately 150° C. and a pressure of approximately 1 bar, while heating heat transfer fluid therewithin from a temperature of approximately 100° C. and a pressure of approximately 10 bar to a temperature of approximately 400° C. with no substantial change in pressure.

It will be appreciated that while the modification illustrated in FIG. 5 includes a solar power plant 102 as described with reference to FIG. 1A, a solar power plant according to FIG. 2A may be provided. It will be further appreciated that the modification described with reference to FIG. 5 may be applied to a solar combined power system comprising a plurality of solar power plants 102 in thermal communication with a single recovery power plant 104 as described with reference to FIGS. 1B and 2B, mutatis mutandis. In addition, any one or more of the modifications described with reference to FIGS. 3 and 4 may be combined with the modification described with reference to FIG. 5, mutatis mutandis.

Figure 6:
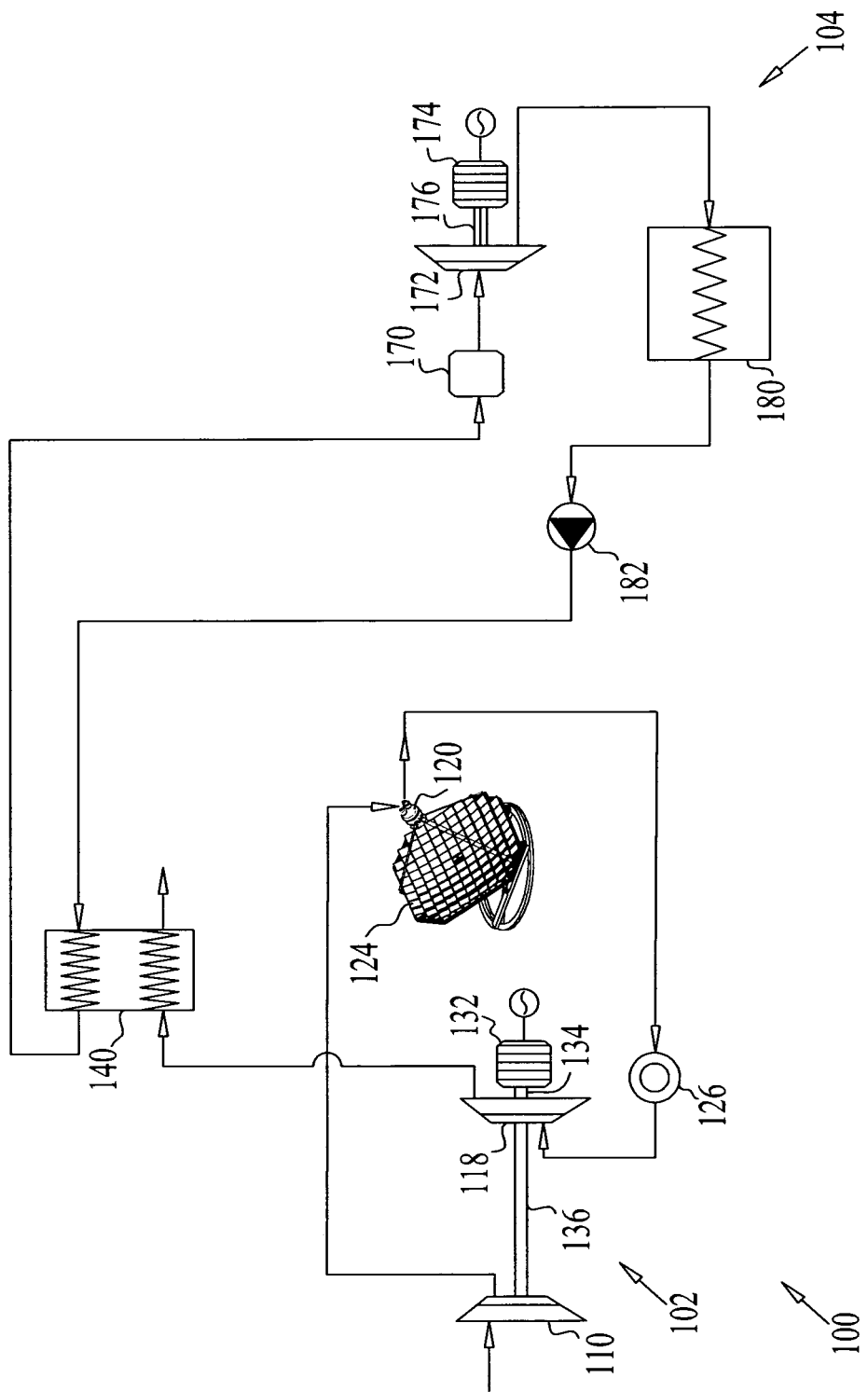

According to a modification illustrated in FIG. 6, the recovery power plant 104 may be provided without its own heat exchanger and associated pump (indicated at 150 and 152, respectively, in FIGS. 1A through 5). According to this arrangement, the working fluid of the recovery power plant 104 is introduced directly into heat exchanger 140 of the solar power plant 102 so as to be heated therein by expanded working fluid of the solar power plant 102 exhausted by turbine 118. It thus may constitute the heat transfer fluid.

In a non limiting example, the working fluid of the solar power plant 102 is air and the working fluid of the recovery power plant 104 is water. The expanded air enters heat exchanger 140 at a temperature of approximately 650° C. and a pressure of approximately 1 bar and exits heat exchanger 140 at a temperature of approximately 150° C. with no substantial change in pressure. The water enters heat exchanger 140 at a temperature of approximately 80° C. and the pressure is approximately 60 bar and is heated therein to a temperature of approximately 600° C. with no substantial change in pressure.

It will be appreciated that while the modification illustrated in FIG. 6 includes a solar power plant 102 as described with reference to FIG. 1A, a solar power plant according to FIG. 2A may be provided. It will be further appreciated that the modification described with reference to FIG. 6 may be applied to a solar combined power system comprising a plurality of solar power plants 102 in thermal communication with a recovery power plant 104, such as described with reference to FIGS. 1B and 2B, mutatis mutandis. In addition, any one or more of the modifications described with reference to FIGS. 3 through 5 may be combined with the modification described with reference to FIG. 6, mutatis mutandis.

Figure 7:
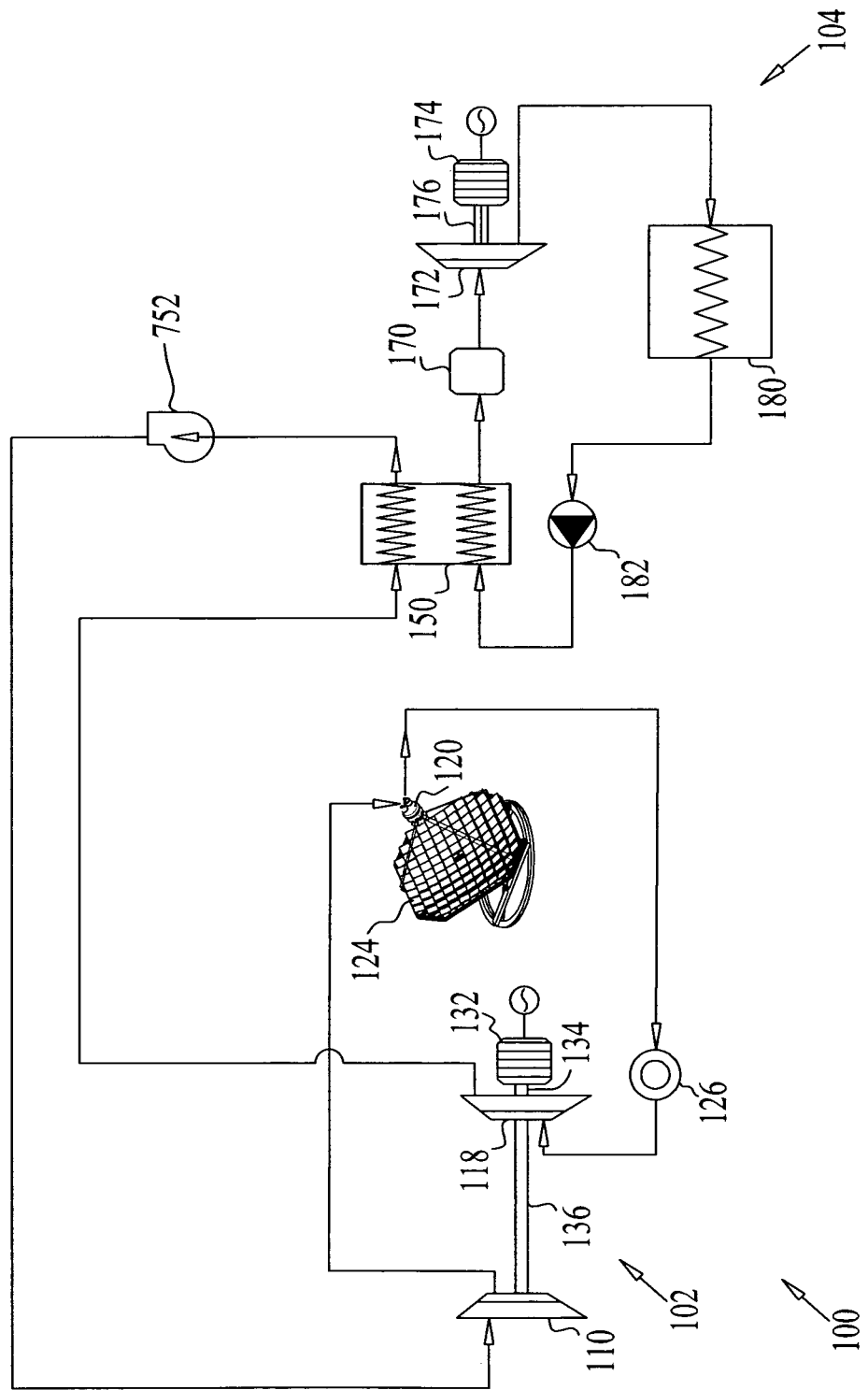

According to a modification illustrated in FIG. 7, the solar power plant 102 may be provided without its own heat exchanger (indicated at 140 in FIGS. 1A through 5). According to this arrangement, the working fluid of the solar power plant 102 is introduced directly into heat exchanger 150 of the recovery power plant 104 after being exhausted by the turbine 118 so as to heat therein working fluid of the recovery power plant 104. It thus may constitute the heat transfer fluid.

In a non-limiting example the working fluid of the solar power plant 102 is carbon dioxide, and the solar power plant is designed to operate under a closed-loop Brayton cycle. The carbon dioxide enters the compressor 110 at a temperature of approximately 50° C. and a pressure of approximately 5 bar. Compressed carbon dioxide flows out of the compressor 110 at a temperature of approximately 250° C. and a pressure of approximately 20 bar.

The compressed working fluid exiting the solar receiver 120 may be further heated by combustor 126 prior to entering the turbine 118. The combustor 126 may be installed in series, between the solar receiver 120 and turbine 118, as illustrated, or may be parallelly installed between the solar receiver 120 and turbine 118, as shown in FIGS. 2A and 2B.

In a non-limiting example, the carbon dioxide exits the solar receiver 120 at a temperature of approximately 1000° C. and a pressure of approximately 20 bar. It then flows into the turbine 118, which expands the carbon dioxide and drives generator 132 via shaft 134 for producing electrical energy therefrom.

The expanded carbon dioxide exits the turbine 118 at a temperature of approximately 650° C. and a pressure of approximately 5.5 bar.

The working fluid of the solar power plant 102 flows into heat exchanger 150 of the recovery power plant 104. Heat exchanger 150 thus directly transfers thermal energy from the working fluid of the solar power plant 102 to that of the recovery power plant 104. The working fluid of the solar power plant 102 is thereafter reintroduced into compressor 110. A blower 752 may be provided to ensure the working fluid of the solar power plant 102 continues to flow between compressor 110 and heat exchanger 150.

It is noted that while, according to the example above, a blower is provided, in a case wherein the fluid of the solar power plant 102 is a liquid, such as water, a pump (not illustrated) may be provided to ensure continuous flow thereof. It is further noted that additional blowers and/or pumps may be added to the solar power plant 102 and/or the recovery power plant 104 to ensure the working fluids or the heat transfer fluid flow continuously.

The working fluid of the recovery power plant 104 enters heat exchanger 150 and is heated therein so as to be expanded within the turbine 172, as described hereinabove with reference to FIG. 1A.

It will be appreciated that while the modification illustrated in FIG. 7 includes a solar power plant 102 as described with reference to FIG. 1A, a solar power plant according to FIG. 2A may be provided. It will be further appreciated that the modification described with reference to FIG. 7 may be applied to a solar combined power system comprising a plurality of solar power plants 102 in thermal communication with a single recovery power plant 104 as described with reference to FIGS. 1B and 2B, mutatis mutandis. In addition, any one or more of the modifications described with reference to FIGS. 3 through 5 may be combined with the modification described with reference to FIG. 7, mutatis mutandis.

Figure 8:
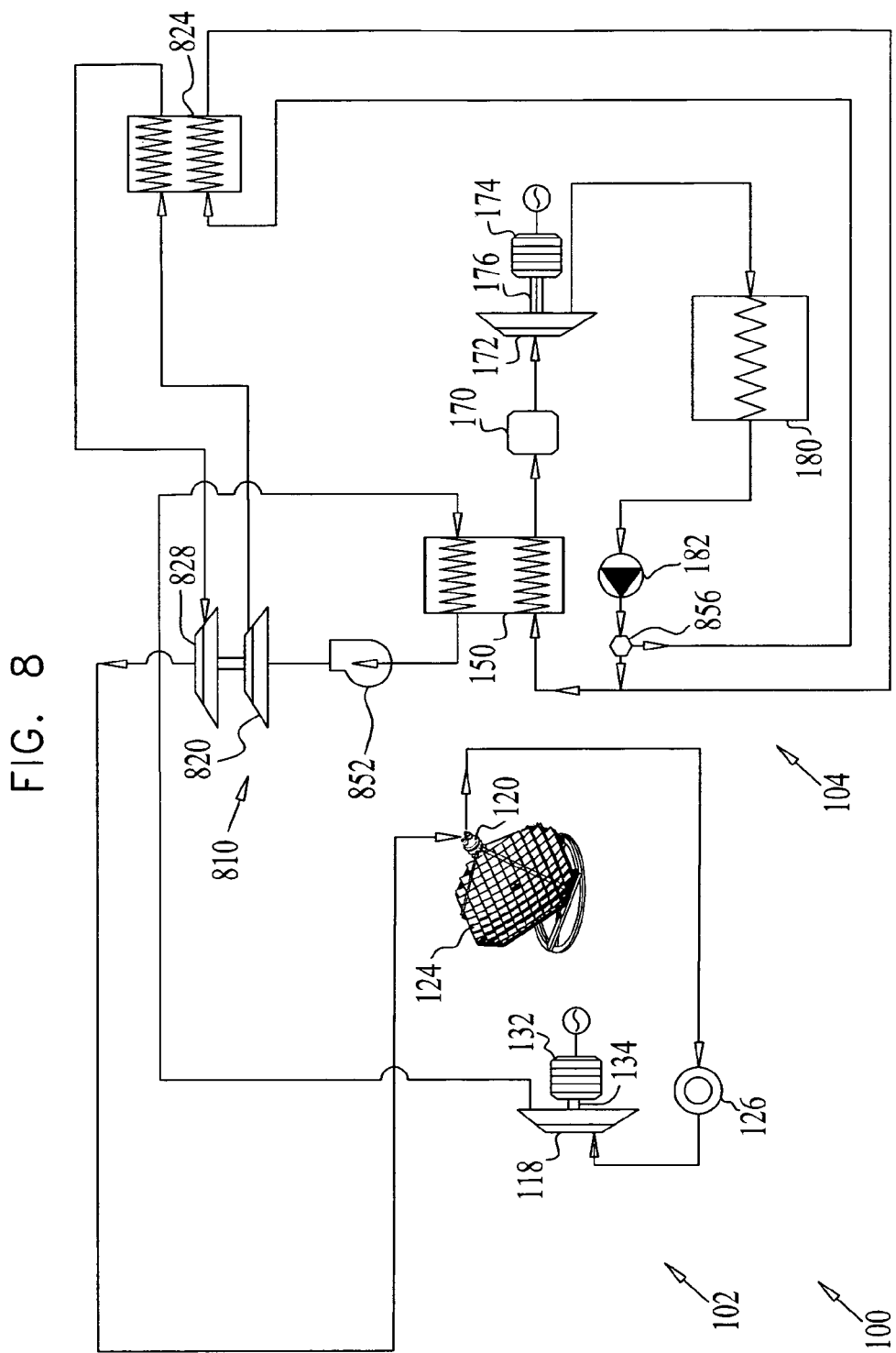

The example described in connection with FIG. 7 may be further modified. As illustrated in FIG. 8, the compressor (indicated at 110 in FIG. 7) may be replaced by a compressor assembly 810 comprising a multi-stage compressor including at least first and second compressors 820, 828 with an intercooling device 824, which may be any suitable device such as a heat exchanger, associated with the recovery power plant 104.

The compressor assembly 810 is arranged such that working fluid which exits the first compressor 820 flows to the intercooling device 824 to be cooled therein. Heat extracted from the working fluid is utilized by the recovery power plant 104, as will be described below. The working fluid then enters the second compressor 828 so as to be further compressed therein. The operation of the rest of the solar power plant 102 is as described with reference to FIG. 7, mutatis mutandis. It is appreciated that the multi-stage compressor may comprise additional compressors besides first and second compressors 820 and 828.

In a non-limiting example, the working fluid is air and enters first compressor 820 at a temperature of approximately 100° C. and at a pressure of approximately 2 bar. The compressed air exits first compressor 820 at a temperature of approximately 250° C. and at a pressure of approximately 6.5 bar. The air is thereafter cooled within intercooling device 824 to a temperature of approximately 100° C. and remains at a pressure of approximately 6.5 bar. The air is introduced into second compressor 828 wherein the air is further compressed and exits second compressor 828 at a temperature of approximately 250° C. and at a pressure of approximately 20 bar. The remainder of the operation of the solar power plant 102 is as described with reference to FIG. 7, mutatis mutandis.

For example, the temperature of the air exiting the solar receiver 120 may be approximately 1100° C. and the pressure is approximately 20 bar, the temperature thereof exiting turbine 118 is approximately 550° C. and the pressure is approximately 2 bar.

A blower 852 may be provided to ensure the working fluid of the solar power plant 102 continues to flow between compressor assembly 810 and heat exchanger 150.

The recovery power plant 104 may be provided with a valve 856 for selectively directing the working fluid exiting pump 182 to flow either to heat exchanger 150 or to intercooling device 824 (or to flow partially to heat exchanger 150 and partially to intercooling device 824).

It will be appreciated that while the modification illustrated in FIG. 8 includes a solar power plant 102 as described with reference to FIG. 1A, a solar power plant according to FIG. 2A may be provided. It will be further appreciated that the modification described with reference to FIG. 8 may be applied to a solar combined power system comprising a plurality of solar power plants 102 in thermal communication with a single recovery power plant 104 as described with reference to FIGS. 1B and 2B, mutatis mutandis. In addition, any one or more of the modifications described with reference to FIGS. 3 through 7 may be combined with the modification described with reference to FIG. 8, mutatis mutandis.

Figure 9:
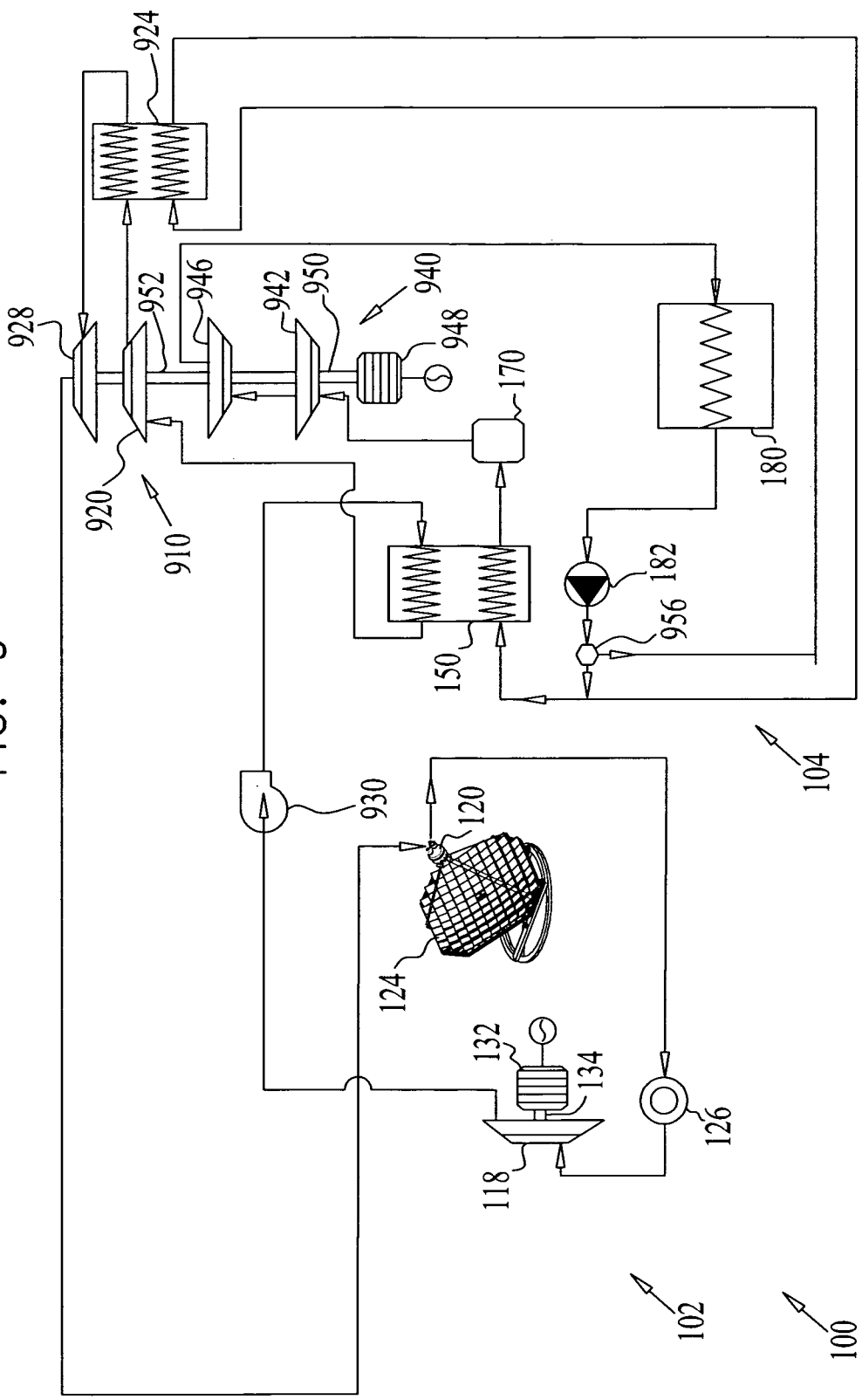

The example described in connection with FIG. 8 may be further modified. As illustrated in FIG. 9, the second turbine (indicated at 172) of the recovery power plant 104 is replaced by a turbine assembly 940 comprising first and second stage turbines 942, 946, which may be coupled with compressor assembly 910 (it will be appreciated that all elements of the compressor assembly 910 are the same as those described with reference to the compressor assembly 810, with reference numerals increased by 100). The first and second stage turbines 942, 946 are coupled to generator 948 via a shaft 950 for producing thereby electricity. According to this example, the turbine assembly 940 constitutes a portion of the recovery power plant 104.

It is appreciated that the turbine assembly 940 may comprise additional turbines besides first and second stage turbines 942, 946.

Figure 10:
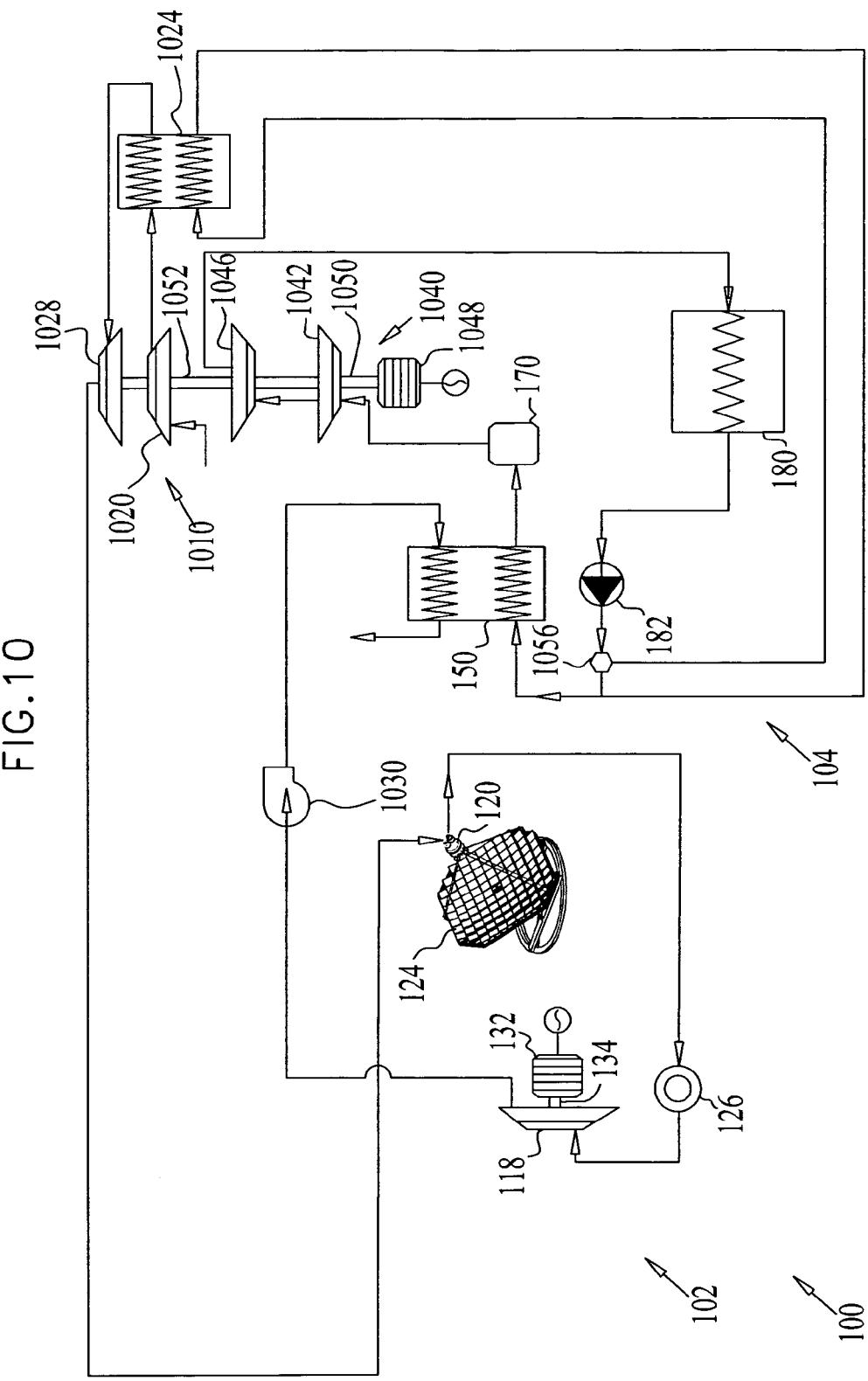

As seen in FIG. 10, the example illustrated in FIG. 9 may be provided with an open-loop Brayton cycle solar power plant 102, mutatis mutandis. It will be appreciated that elements indicated by reference numerals in FIG. 9 between 900 and 999, are indicated by corresponding reference numerals increased by 100 in FIG. 10.

It will be appreciated that while the modifications illustrated in FIGS. 9 and 10 includes a solar power plant 102 as described with reference to FIG. 1A, a solar power plant according to FIG. 2A may be provided. It will be further appreciated that the modifications described with reference to FIGS. 9 and 10 may be applied to a solar combined power system comprising a plurality of solar power plants 102 in thermal communication with a single recovery power plant 104 as described with reference to FIGS. 1B and 2B, mutatis mutandis. In addition, any one or more of the modifications described with reference to FIGS. 3 through 8 may be combined with the modification described with reference to FIGS. 9 and 10, mutatis mutandis.

As seen in FIG. 11A, a plurality of recovery power plants 104 may be provided, driven by a single solar power plant 102. Alternatively, as illustrated in FIG. 11B, a plurality of solar power plants 102 may be provided, driving a plurality of recovery power plants 104.

As illustrated in FIGS. 11A and 11B, ducts 1130 are provided, as necessary, for carrying heat transfer fluid from the solar power plant(s) 102 to each of the recovery power plants 104. Ducts 1132 are provided, as necessary, for carrying heat transfer fluid from the recovery power plants 104 toward the solar power plant(s) 102.

As illustrated in FIG. 11B, ducts 1190 are provided, as necessary, for carrying heat transfer fluid from the recovery power plants 104 to each of the solar power plants 102. Ducts 1192 are provided, as necessary, for carrying heat transfer fluid from the solar power plants 102 toward the recovery power plants 104.

It will be appreciated that the solar power plants 102 and recovery power plants 104 according to FIGS. 11A and 11B may be designed according to any one or more example described in connection with FIGS. 1A through 10, mutatis mutandis.

Ducts 1130, 1132, 1190, 1192 and/or the conduits may be formed at least partially of pipes designed to transfer the heat transfer fluid and the working fluids. Such pipes are generally formed with thermal insulation so as to prevent heat losses of the heat transfer fluid and the working fluids as the heat transfer fluid and the working fluids flow along main duct 1130, 1132, 1190, 1192 and/or the conduits. Such pipes may be a Pipe-in-pipe pipeline commercially available by ITP InTerPipe, Inc. of 16360 Park Ten Place, Suite 327 Houston, Tex., USA, for example.

Providing a plurality of solar power plants 102 instead of one provides an increased flow rate of the heat transfer fluid flowing therefrom to one or more recovery power plants 104. Thus the electrical output of the solar combined cycle power system increases. Typically, ten to a few hundred solar power plants 102 may be employed. In a non-limiting example, wherein a single solar power plant 102 is employed, the electrical output of the solar combined cycle power system with a dish 124 of a surface area of about 480 m² is approximately 90-120 Kilowatt. Whereas, wherein a hundred solar power plants 102 are employed, the electrical output of the solar combined cycle power system is approximately 25 Megawatt.

Additionally, use of dish 124 along with the solar receiver 120 for concentrating the solar radiation in the plurality of solar power plants 102 allows for selecting the number of solar power plants according to a desired output of a solar combined cycle power system with relative ease. This is due to the relatively few components needed for sun-tracking and concentrating the solar radiation, i.e., mainly the dish 124 and solar receiver 120, which provide for enhanced modularity of the solar power plants 102.

Generally, selection of the number of solar power plants 102 in accordance with the desired output of a solar combined cycle power system enables structuring a solar combined cycle power system in accordance with the geographical conditions of a specific location of the solar combined cycle power system. For example, in areas wherein the annual direct solar radiation emitted from the sun is of relatively low intensity, a relatively high number of solar power plants 102 may be employed, compared to an area with more annual direct solar radiation, so as to compensate for the relatively low solar intensity. In contrast, in an area wherein the annual solar radiation emitted from the sun is of relatively high intensity, the number of solar power plants 102 selected may be lower than in other areas.

Additionally, it is known in the art that each turbine is designated to perform with maximal efficiency at a predetermined flow rate of incoming heated working fluid. Thus selection of the number of the solar power plants 102 enables structuring a solar combined cycle power system in accordance with a desired predetermined flow rate suitable for a specific selected turbine of the recovery power plants 104, thereby ensuring that the turbine thereof will perform at maximal efficiency.

It will be appreciated by persons skilled in the art that the present invention is not limited by what has been particularly shown and described herein above. Rather the scope of the present invention includes both combinations and subcombinations of the various features described hereinabove as well as variations and modifications which would occur to persons skilled in the art upon reading the specifications and which are not in the prior art, mutatis mutandis.

The invention claimed is:

1. A combined cycle power system, comprising:
   a plurality of solar power plants, each solar power plant comprising:
      a concentrating dish configured to concentrate solar radiation;
      a solar receiver disposed on the concentrating dish and configured to utilize concentrated solar radiation for heating a first working fluid, and
      a first turbine connected to and receiving the heated first fluid from the solar receiver, the first turbine configured for generating electricity by expansion therein of the heated first working fluid; and
   at least one recovery power plant connected to and receiving exhaust heat from the plurality of solar power plants, the at least one recovery power plant comprising:
      a heat recovery unit configured for receiving and utilizing the exhaust heat from the plurality of solar power plants to heat a second working fluid, and
      a second turbine configured for generating electricity by expansion therein of the heated second working fluid.

2. The system according to claim 1, wherein said heat recovery unit further comprises a heat transfer fluid configured to transfer said exhaust heat from said solar power plant to said recovery power plant.

3. The system according to claim 1, wherein said solar power plant is a Brayton-cycle plant.

4. The system according to claim 1, wherein said recovery power plant is a Rankine-cycle plant.

5. The system according to claim 1, being configured to introduce said exhaust heat into at least one heat exchanger.

6. The system according to claim 5, being further configured to utilize residual heat exiting said at least one heat exchanger for providing thermal energy to a thermal system.

7. The system according to claim 1, further comprising a thermal storage assembly configured to selectively store at least some of said exhaust heat.

8. The system according to claim 1, further comprising a compressor configured to compress said first working fluid prior to entering said solar receiver.

9. The system according to claim 1, comprising a multistage compressor comprising at least first and second compressors and an intercooling device configured for cooling said first working fluid following compression within said first compressor and prior to compression within said second compressor.

10. The system according to claim 1, wherein said second turbine comprises a multi-stage turbine.

11. The system according to claim 1, comprising a plurality of said solar power plants.

12. A combined cycle power system, comprising:
   a plurality of solar power plants, each solar power plant comprising:
      a solar collection system configured to utilize impinging solar radiation for heating a first working fluid, the solar collection system comprising a concentrating dish and a solar receiver disposed on the concentrating dish; and
      a first turbine connected to and receiving the heated first fluid from the solar collection system, the first turbine configured for generating electricity by expansion therein of the heated first working fluid; and
   at least one recovery power plant connected to and receiving exhaust heat from the plurality of solar power plants, the at least one recovery power plant comprising:
      a heat recovery unit configured for receiving and utilizing the exhaust heat from said plurality of solar power plants to heat a second working fluid, and
      a second turbine configured for generating electricity by expansion therein of the heated second working fluid.

13. The system according to claim 12, wherein said solar power plant is a Brayton-cycle plant.

14. The system according to claim 12, wherein said recovery power plant is a Rankine-cycle plant.

15. The system according to claim 12, being configured to introduce said exhaust heat into at least one heat exchanger.

16. The system according to claim 12, further comprising a thermal storage assembly configured to selectively store at least some of said exhaust heat.

17. The system according to claim 12, comprising a multistage compressor comprising at least first and second compressors and an intercooling device configured for cooling said first working fluid following compression within said first compressor and prior to compression within said second compressor.

18. The system according to claim 12, wherein said second turbine comprises a multi-stage turbine.

19. The system according to claim 12, comprising a plurality of said solar power plants.

20. A method for generating electricity, comprising:
heating a first working fluid using a first solar collection system comprising a concentrating dish and a solar receiver disposed on the concentrating dish;
expanding the heated first working fluid within a first turbine, thereby generating electricity;
heating a first working fluid using a second solar collection system comprising a concentrating dish and a solar receiver disposed on the concentrating dish;
expanding the heated first working fluid within a second turbine, thereby generating electricity;
heating a second working fluid by heat exhausted from said first turbine and said second turbine; and
expanding the heated second working fluid within a second turbine, thereby generating electricity.

21. A combined cycle power system, comprising:
a plurality of solar power plants, each comprising
at least one concentrating dish configured to concentrate solar radiation,
a solar receiver disposed on the at least one concentrating dish and configured to utilize concentrated solar radiation for heating a first working fluid, and
a first turbine configured for generating electricity by expansion therein of the heated first working fluid, the solar receiver supplying the first working fluid to the first turbine; and
at least one recovery power plant in fluid communication with the plurality of solar power plants, comprising
a heat recovery unit configured for utilizing exhaust heat of the first turbine to heat a second working fluid, and
a second turbine configured for generating electricity by expansion therein of the heated second working fluid.

22. A combined cycle power system comprising a plurality of solar power plant units connected to and supply exhaust heat to a heat recovery unit, each solar power plant unit comprising:
a solar collector unit comprising a combined concentrating dish and solar receiver unit configured to concentrate solar radiation and heat a first working fluid;
a first turbine connected to the solar collector unit and receiving the heated first working fluid from the solar collector unit, the turbine configured for generating electricity by expansion therein of the heated first working fluid;
a first heat exchanger connected to and receiving exhaust heat from the first turbine; and
a first working fluid circuit configured to circulate the heated first working fluid from the solar collector unit to the first turbine and then circulate cooled first working fluid back to the solar collector unit.

23. A combined cycle power system, comprising:
a plurality of solar power plant units, each solar power plant unit comprising
a solar collector unit comprising a combined concentrating dish and solar receiver configured to concentrate solar radiation and heat a first working fluid,
a first turbine connected to and receiving the heated first fluid from the solar collector unit, the first turbine configured for generating electricity by expansion therein of the heated first working fluid;
a first working fluid circuit configured to circulate the heated first working fluid from the solar collector unit to the first turbine and then circulating cooled first working fluid back to the solar collector unit; and
a first heat exchanger connected to and receiving exhaust heat from the first turbine;
at least one heat recovery power plant unit comprising
a second heat exchanger;
a second turbine connected to and receiving heated second working fluid from the second heat exchanger, the second turbine configured for generating electricity by expansion therein of the heated second working fluid; and
a second working fluid circuit configured to circulate the heated second working fluid from the second heat exchanger to the second turbine and then circulating cooled second working fluid back to the second heat exchanger; and
a third working fluid circuit unit configured to circulate a heated third working fluid from the first heat exchanger to the second heat exchanger and then circulate cooled third working fluid back to the first heat exchanger.

* * * * *